Figure 3:
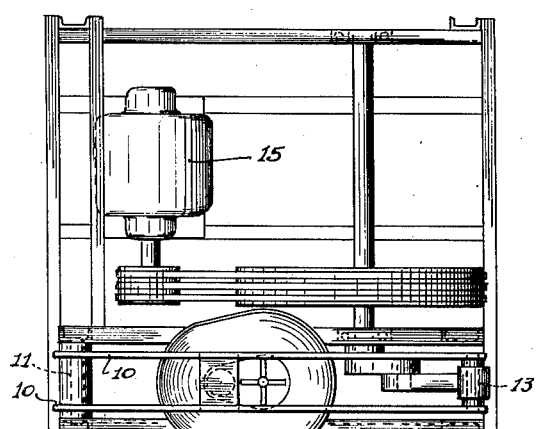

Feb. 20, 1951 C. T. WALTER 2,542,739
COMPRESSING MACHINE
Filed Feb. 23, 1945

INVENTOR.
Charles T. Walter
BY
R. G. Story
ATTORNEY

Patented Feb. 20, 1951

2,542,739

UNITED STATES PATENT OFFICE 2,542,739

COMPRESSING MACHINE

Charles T. Walter, Indianapolis, Ind., assignor, by mesne assignments, to Swift & Company, a corporation of Illinois Application February 23, 1945, Serial No. 579,407

2 Claims. (Cl. 100—57)

1

This invention relates to a machine for compacting a pulverized compressible material, and more particularly to a machine for compacting a pulverized dehydrated meat product to a stick form.

It is, therefore, an object of this invention to provide a machine for compressing and molding a pulverized material.

It is another object of this invention to compact a pulverized material to a stick form of a cross section adapted to neatly fit a container.

Other objects will appear from the specification below.

Figure 4:
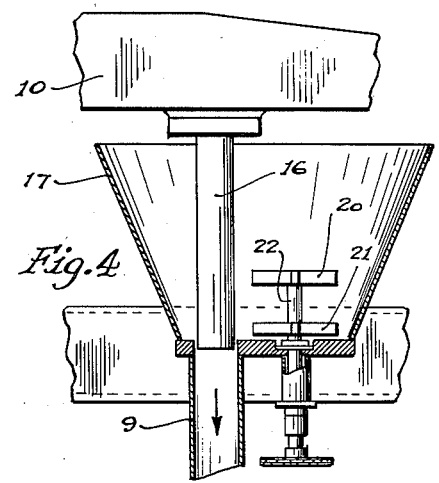
Figure 1:
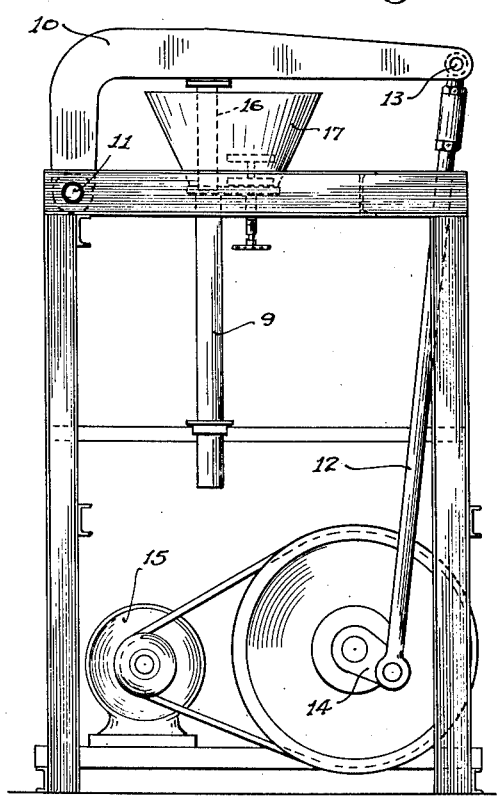
Figure 2:
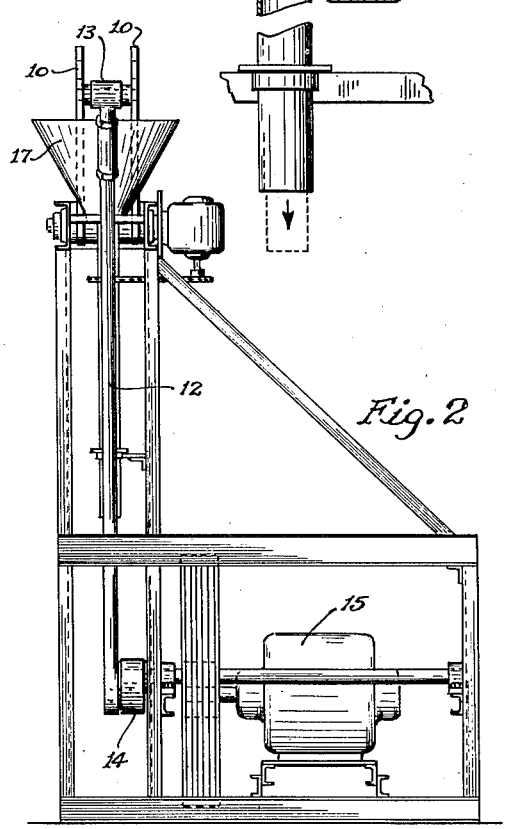

In the drawing,

Figure 1 represents a front elevation showing the elements of a machine forming the preferred embodiment of this invention, Figure 2 is a side elevation of the machine shown in Figure 1, Figure 3 is a top plan view of the machine shown in Figure 1, and Figure 4 is a detailed view partly broken away showing the compacting passage and hopper feed mechanism.

During the processing of many products, such as meat products and the like, it is sometimes necessary to divide the product into relatively small particles. For example, meat is frequently comminuted in order to effect the drying thereof. A problem has arisen, however, in the packaging of such a dried pulverized product because of the bulky nature of the dehydrated meat product and its tendency to become rancid.

It is desirable in packaging such a product to provide as compact a package as possible and also to eliminate as much air as possible from contact with the product which may become rancid upon exposure to oxygen. The present invention provides a machine wherein both of these desiderata are attained in the handling of dehydrated meat particles and the like, and it has been found that a pulverized dehydrated meat product can be readily compacted to occupy a space about one-half as large as it did originally while simultaneously molding the pulverized product into stick form of desired cross section.

The principle upon which this invention operates is that a dehydrated pulverized meat product can be forced through an elongated passage of relatively narrow cross section such that the resistance of the walls of the passage to the movement of a slug of meat particles through the passage is utilized to compact the meat particles tightly together to effect a practical solidification of the product. In so doing, all air pockets are eliminated from the product and the product is molded into a desired cross-sectional shape.

One embodiment of a machine for performing this invention is represented in the drawing and referring to Figure 1, the elongated passage 9 is shown, through which the product is pressed. A lever 10 is pivotally mounted on the frame of the machine to oscillate about an axis 11 and the lever is driven from link 12 through connection 13. Link 12 in turn is driven by any suitable means such as crank 14 which is energized through a suitable drive hook up from motor 15. A plunger 16 is mounted on lever 10 in substantially axial alignment with the inlet end of the elongated passage 9 to press the material being handled therethrough, and the plunger 16 is of a length to extend through the supply hopper 17. In cross section, plunger 16 at its working end is of approximately the same configuration as the cross section of the flow passage 9 whereby as the lever 10 is pulled downwardly by link 12, the plunger 16 is driven into the inlet end of the flow passage 9.

The supply hopper 17 is suitably mounted upon the frame of the machine to be supported around the inlet end of the flow passage 9 and suitable agitating means, as driven paddles 20 and 21, are mounted in the bottom of hopper 17. The paddles 20 and 21 are mounted upon a rotating shaft 22 and are designed to throw the pulverized material collecting in the bottom of the hopper into the inlet end of passage 9 when the plunger 16 is withdrawn from the inlet end of the passage.

The passage 9 may have any desired cross section and as above stated, the working end of plunger 16 should have approximately the same configuration as the inlet end of the passage. The passage may be of any desired length. However, it is essential that the length be so great as to provide the resistance characteristics desired such that a relatively high resistance is presented to the flow of the material through the passage. The resistance must be of such a degree as to materially retard the flow of material through the passage when the passage is full whereby the material is compressed as it is forced through the flow passage 9.

In practice, for example, a three inch cylindrical passage approximately three feet in length, having dehydrated beef particles forced therethrough, presents such resistance to the flow of this material therethrough that a driving pressure of between 200 to 400 pounds per square inch is required to force the meat through the passage. During their flow the beef particles will be compressed to a stick form and will occupy a space approximately one-half of that originally occupied.

The flow passage 9 is preferably designed to have a cross section approximately the same as the container into which the product is to be placed. In such a circumstance, the material being driven through the flow passage may be issued directly from the flow passage into a container to fill it. As the material issues from the flow passage and as soon as the container is filled, the container may be twisted slightly to break the solidified stick of material and the plane of the break will be such that a lid may be readily placed on the container.

In using the above described machine, the pulverized material to be compacted to stick form is placed in the hopper 17. The driving link 12 is energized and as the link reciprocates the lever 10 is caused to oscillate about its pivotal mounting 11. As the lever 10 oscillates, the plunger 16 is caused to reciprocate into and out of the inlet end of flow passage 9, and while the plunger is lifted out of the inlet end, pulverized material is thrown into the inlet end of passage 9 by paddles 20 and 21. The material thrown into the inlet is delivered through the passage until a substantially solidified block of material can be built up in the passage whereupon productive operation of the machine can be started.

After a compressed product of pulverized material has been created in the passage 9, the plunger 16 is reciprocated with lever 10 to drive the pulverized material fed into the inlet end into the flow passage 9. Due to the resistance offered by the walls of the passage to the movement of the product through the passage, the material behind the block of previously compressed material is compacted as the plunger drives into the inlet end of the passage. The previously compacted material in the passage continues to be compressed more and more as the resistance to the movement of the compressed block is encountered and as soon as this resistance is overcome, the material in the flow passage is delivered forwardly during the remainder of the stroke of the plunger 16. Upon completion of its stroke, the plunger 16 is withdrawn and additional material is fed into the inlet end of passage 9 so that the compacting cycle may be repeated. It is apparent that, as material is forced into the inlet end of the passage 9, compacted material is driven from the outlet end of the passage. If desired, the stroke of the plunger can be controlled to force out of the passage on each stroke just enough compacted material to fill a container.

The above described machine has been found to be operative to act upon a pulverized dehydrated meat product that is to be compressed to stick form. Such material is shaped and compressed, as above described, and issues from the lower end of the flow passage 9 during each feeding cycle of plunger 16. When pulverized dehydrated meat is passed through such a device, the compacted meat issues from the outlet end of passage 9, and since such compressed meat is not appreciably resilient, the compacted material may be delivered directly into a container having substantially the same cross-sectional dimensions as the flow passage 9. If it is not desired to pass the compacted product immediately into a container, the material may be broken off into desired lengths as it passes from the outlet end of the passage. In handling a meat product the individual slugs of meat fed into the passage 9 tend to have a plane of weakness formed between themselves so that upon issuing from the outlet end, the solidified stick may be broken along these planes if desired.

The above described machine shows the preferred embodiment of this invention. Modifications thereof may occur to those skilled in the art, all of which are contemplated to fall within the scope of the following claims.

I claim:

1. A compressor comprising a frame, a hopper supported by the upper portion of the frame in a substantially central location relative to said upper portion, a tube extending downwardly from the bottom of the hopper, a plunger in substantially axial alignment with the tube, means for actuating the plunger connected to the upper end of the plunger, said means including a rocker arm pivoted at one end on the upper portion of the frame on one side of the hopper and provided with actuating means on its other end on the opposite side of the hopper, and means below the hopper for driving said actuating means.

2. A compressor comprising a frame, a hopper supported by the upper portion of the frame in a substantially central location relative to said upper portion, a tube extending downwardly adjacent one side of and from the bottom of the hopper, a shaft extending through the bottom of the hopper and being parallel to the tube, a feeder within the hopper and on the shaft, means for driving the shaft, a plunger in substantially axial alignment with the tube, means for actuating the plunger connected to the upper end of the plunger, said means including a rocker arm pivoted at one end on the upper portion of the frame on one side of the hopper and provided with actuating means on its other end on the opposite side of the hopper, and means below the hopper for driving said actuating means.

CHARLES T. WALTER.

REFERENCES CITED

The following references are of record in the file of this patent:

UNITED STATES PATENTS

| Number | Name | Date |
|---|---|---|
| 80,035 | Truxell | July 14, 1868 |
| 127,859 | Eaton | June 11, 1872 |
| 197,533 | Wolf | Nov. 27, 1877 |
| 280,478 | Hunter et al. | July 3, 1883 |
| 345,614 | Borgfeldt | July 13, 1886 |
| 603,714 | Veith | May 10, 1898 |
| 640,034 | Rubarts | Dec. 26, 1899 |
| 1,890,458 | Dziedzic | Dec. 13, 1932 |
| 2,020,843 | Lohner | Nov. 12, 1935 |
| 2,445,752 | Adams | July 27, 1948 |

FOREIGN PATENTS

| Number | Country | Date |
|---|---|---|
| 51,399 | Germany | Apr. 14, 1890 |